United States Patent
Lai et al.

(10) Patent No.: US 7,997,748 B2
(45) Date of Patent: Aug. 16, 2011

(54) STEREOSCOPIC DISPLAY DEVICE

(75) Inventors: Chih-Ming Lai, Miao-Li Hsien (TW);
Chien-Liang Yeh, Miao-Li Hsien (TW);
Tze-Ching Tung, Miao-Li Hsien (TW);
Chun-Wei Wang, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 317 days.

(21) Appl. No.: 12/399,202

(22) Filed: Mar. 6, 2009

(65) Prior Publication Data
US 2009/0237914 A1    Sep. 24, 2009

(30) Foreign Application Priority Data
Mar. 24, 2008   (CN) .......................... 2008 1 0300691

(51) Int. Cl.
G09F 13/04    (2006.01)
G02F 1/13357  (2006.01)

(52) U.S. Cl. ........................ 362/97.3; 362/97.1; 362/231

(58) Field of Classification Search ................. 362/97.1, 362/97.3, 330, 230, 231, 97.2, 97.4, 800
See application file for complete search history.

(56) References Cited

U.S. PATENT DOCUMENTS
| | | | |
|---|---|---|---|
| 2003/0067775 A1* | 4/2003 | Nagai et al. ................... | 362/240 |
| 2006/0198143 A1* | 9/2006 | Cheung ......................... | 362/251 |
| 2009/0213575 A1* | 8/2009 | Blumel et al. ................ | 362/97.3 |
| 2010/0284169 A1* | 11/2010 | Bertram et al. .............. | 362/97.1 |

FOREIGN PATENT DOCUMENTS
CN    1525212 A    9/2004
CN    1576953 A    2/2005

* cited by examiner

*Primary Examiner* — Bao Q Truong
(74) *Attorney, Agent, or Firm* — Clifford O. Chi

(57) ABSTRACT

A stereoscopic display device includes a substrate, a plurality of odd-line light source units, a plurality of even-line light source units, a lens array, and a circuit. The odd-line light source units and the even-line light source units are provided at a first side of the substrate and spaced from each other. Each of the odd-line light source units and the even-line light source units include a plurality of light source pixel units. The lens array is arranged on the substrate at the first side thereof and includes a plurality of cylindrical stripe-like lenses, the cylindrical stripe-like lenses extending substantially parallel to each other. The circuit is configured for alternately outputting a first time sequence display signal to the odd-line light source units and a second time sequence display signal to the even-line light source units.

14 Claims, 9 Drawing Sheets

STEREOSCOPIC DISPLAY DEVICE

CROSS REFERENCE TO RELATED APPLICATION

This application is related to commonly-assigned copending application Ser. No. 11/967,028, entitled "BILLBOARD", and Ser. No. 11/964,810, entitled "BILLBOARD". Disclosures of the above-identified application are incorporated herein by reference in its entirety.

BACKGROUND

1. Technical Field

The present invention relates to information display devices and, particularly, to a stereoscopic display television.

2. Description of the Related Art

Three dimensional (3D) television employs some form of stereoscopy and a viewing device to project a television program into a realistic three-dimensional field.

The direct way to achieve this is to wear a special type of eyeglasses (or a Virtual Reality helmet) with two small displays opposite the eyes. This method is universal but is technically complex. The whole contraption is too bulky and heavy and it is hard to make the displays small yet with a high resolution.

Another method involves using eyeglasses with LCD shutters. The shutters are being closed and opened alternately. However, first, the response time of LCD shutters is hard to meet the requirement of visual persistence of human eyes. Second, the glasses must be strictly in sync with the alteration of the frames. Otherwise the picture may not achieve the 3D effect.

What is needed, therefore, is a new stereoscopic display device that can overcome the above-described shortcomings.

BRIEF DESCRIPTION OF THE DRAWINGS

Many aspects of the present stereoscopic display device can be better understood with reference to the following drawings. The components in the drawings are not necessarily drawn to scale, the emphasis instead being placed upon clearly illustrating the principles of the present stereoscopic display device. Moreover, in the drawings, like reference numerals designate corresponding parts.

DETAILED DESCRIPTION OF THE INVENTION

Figure 1:
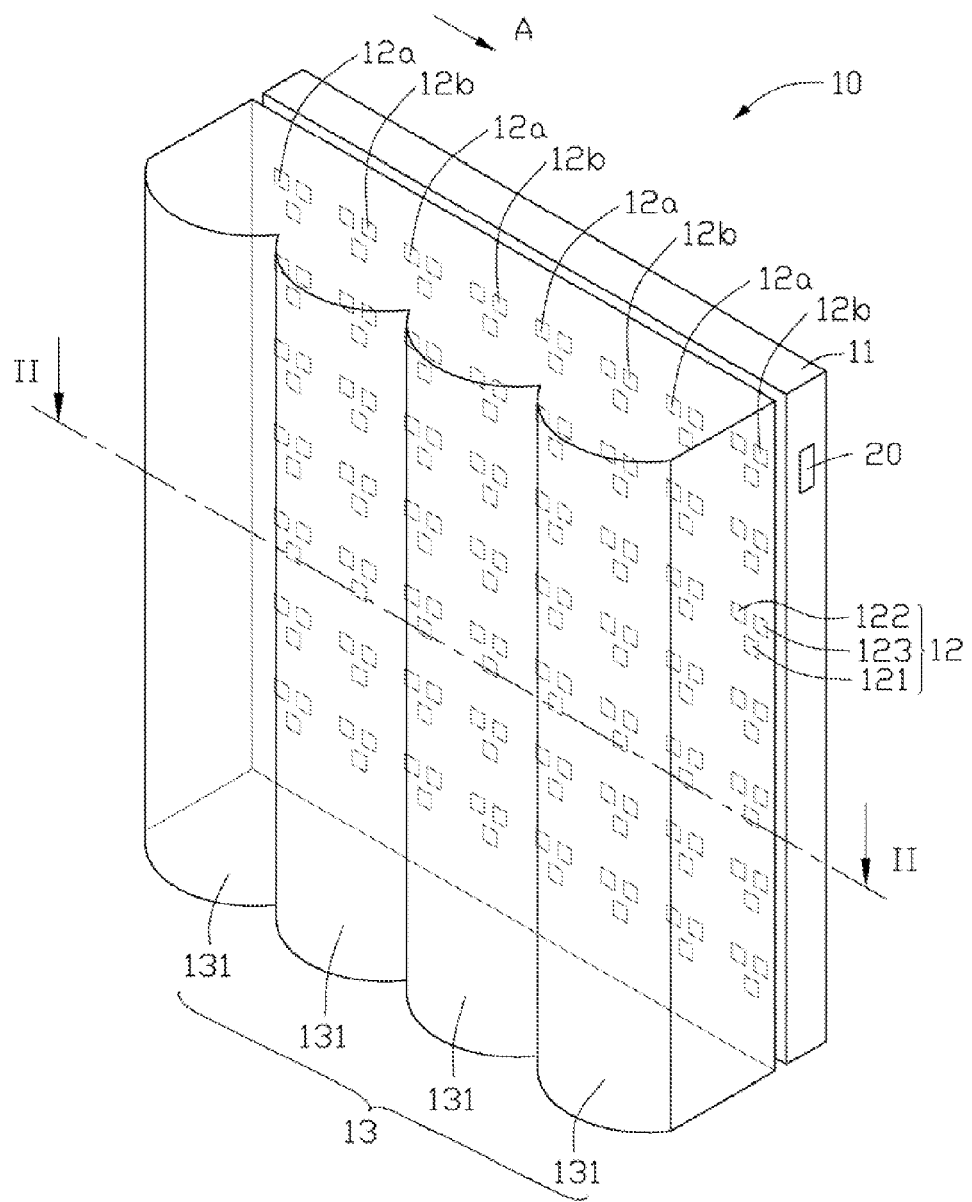
FIG. 1 is a schematic view of a stereoscopic display device, in accordance with an exemplary embodiment, the stereoscopic display device including a plurality of light source units, each light source unit including three LED light sources arranged in a triangular pattern.
Figure 2:
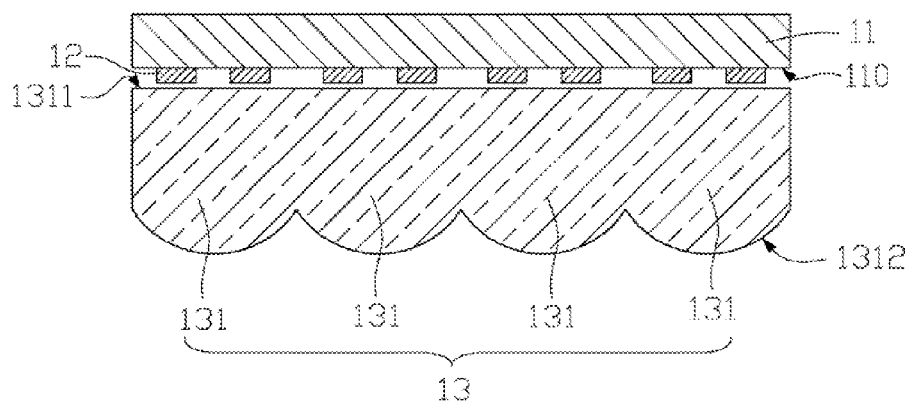
FIG. 2 is a cross-sectional view of the stereoscopic display device taken along line II-II of FIG. 1.

Referring to FIGS. 1 and 2, a stereoscopic display device 10, according to an exemplary embodiment, includes a substrate 11, a plurality of light source units 12, and a lens array 13.

The substrate 11 includes a surface 110. In the exemplary embodiment, the lens array 13 is arranged on the surface 110 of the substrate 11, and the light source units 12 are located between the surface 110 of the substrate 11 and the lens array 13.

Figure 3:
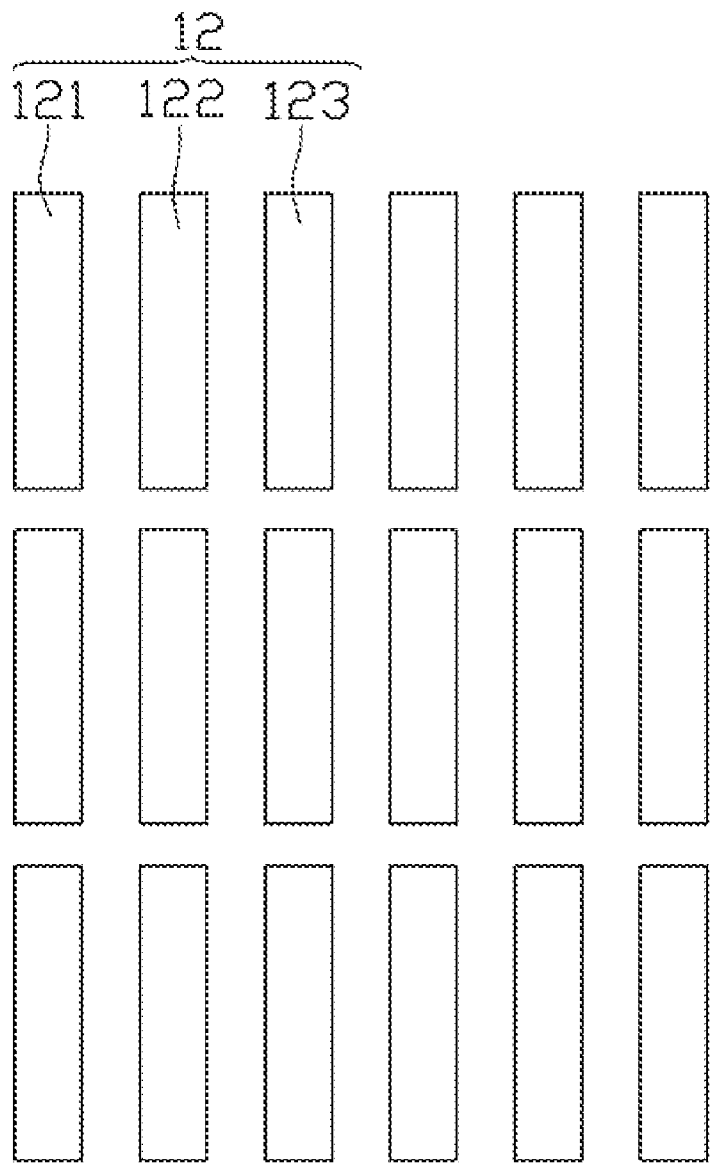
FIG. 3 is a schematic view of the LED light sources arranged in vertical stripes.
Figure 4:
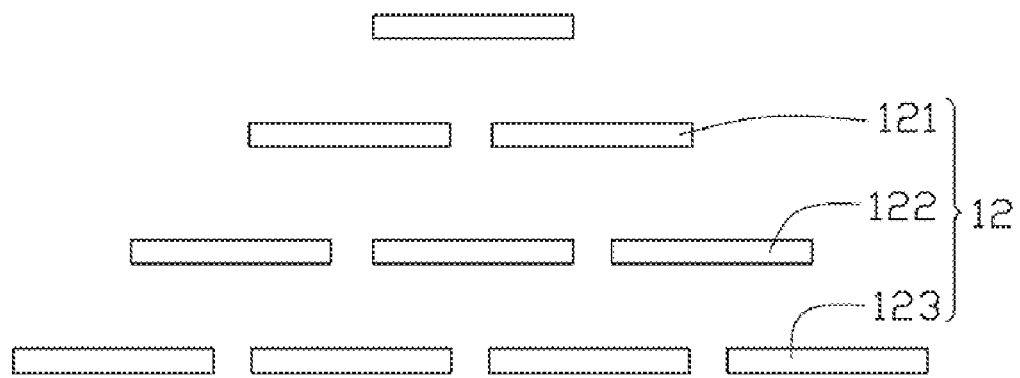
FIG. 4 is a schematic view of the LED light sources arranged in a pyramid pattern.

The light source units 12 are arranged in a plurality of odd-line light source units 12a and a plurality of even-line light source units 12b. Each of the odd-line light source units 12a or the even-line light source units 12b includes a plurality of the light source units 12 arranged in at least a line. The odd-line light source units 12a and the even-line light source units 12b are spaced from each other. Each of the light source units 12 includes at least three LED light sources emitting different colors of light, a red LED 121, a green LED 122, and a blue LED 123 for example. The combination of each light source unit 12 creates the full range of colors to be displayed on the stereoscopic display device 10. The three LED light sources (121, 122, 123) can be set up in different patterns. The LED light sources (121, 122, 123) within each light source unit 12 may be arranged in a triangular pattern (referring to FIG. 1), vertical stripes (referring to FIG. 3), or a pyramid pattern (referring to FIG. 4).

Figure 5:
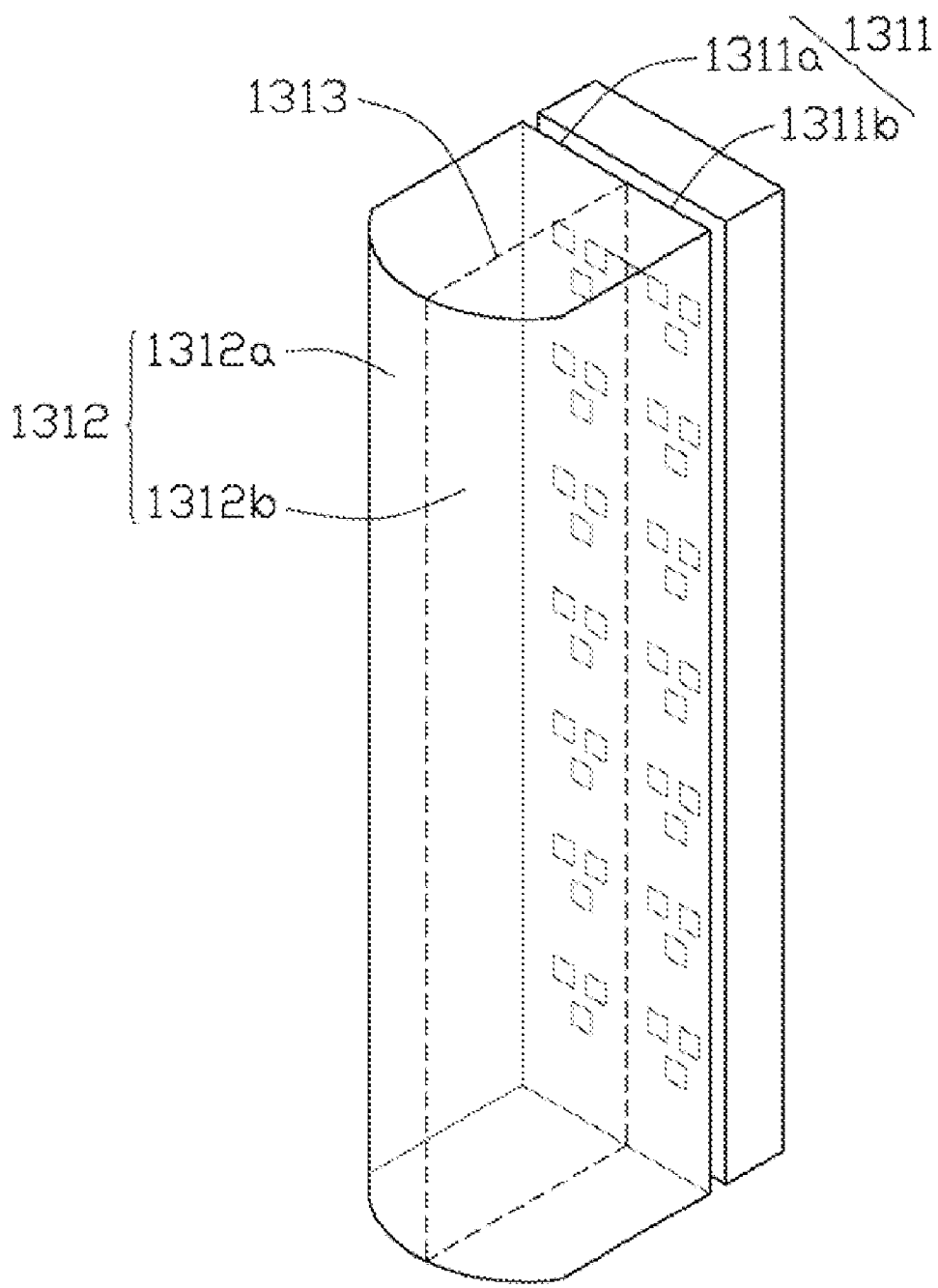
FIG. 5 is a schematic view of the part of the stereoscopic display device in FIG. 1.

The lens array 13 includes a plurality of cylindrical stripe-like lenses 131 arranged in a row or a column. The cylindrical stripe-like lenses 131 are parallel to each other. Referring to FIG. 5, each cylindrical lens 131 has an incident surface 1311 and a light emitting surface 1312 opposite to the incident surface 1311. The incident surface 1311 is a plane surface, and the light emitting surface 1312 is a cylindrical surface. The incident surface 1311 of each cylindrical lens 131 is opposite to the surface 110 of the substrate 11. A meridian plane 1313 perpendicular to the incident surface 1311 divides the light emitting surface 1312 of each cylindrical lens 131 into a first cylindrical surface 1312a and a second cylindrical surface 1312b, and divides the incident surface 1311 of each cylindrical lens 131 into a first part 1311a and a second part 1311b. The first cylindrical surface 1312a of each cylindrical lens 131 is spaced from each other by the second cylindrical surface 1312b.

Figure 6:
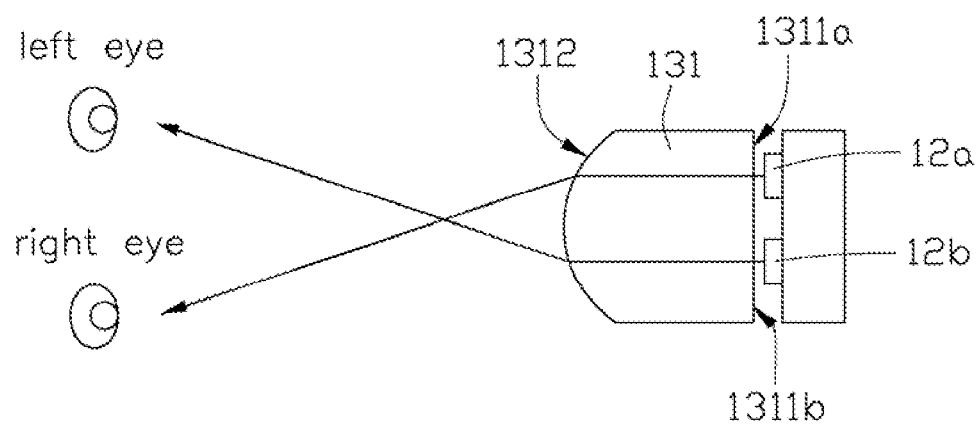
FIG. 6 is an explanatory view for explaining the operation of the stereoscopic display device in accordance with an exemplary embodiment.
Figure 7:
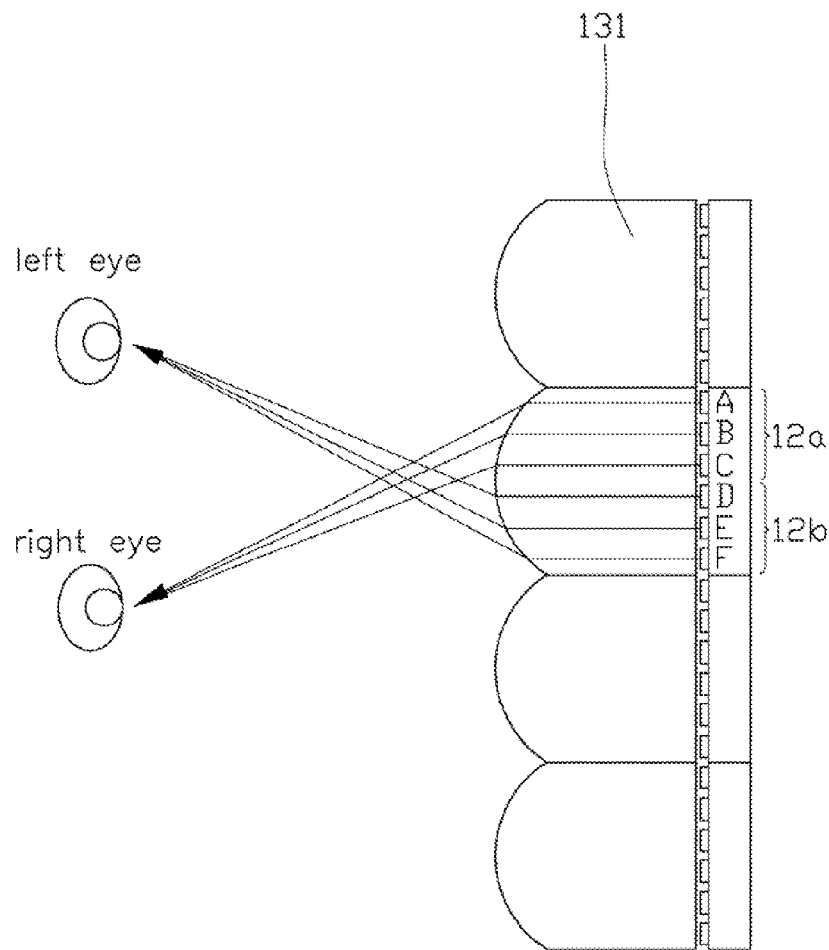
FIG. 7 is an explanatory view for explaining the operation of the stereoscopic display device in alternative embodiments.

Referring to FIGS. 5 and 6, one cylindrical lens 131 corresponds to one odd-line light source unit 12a and one even-line light source unit 12b adjacent to the odd-line light source unit 12a. In the exemplary embodiment, each of the odd-line light source units 12a or the even-line light source units 12b includes a plurality of light source units 12 arranged in one line. The first part 1311a of each incident surface 1311 corresponds to one odd-line light source unit 12a, and the second parts 1312b of each incident surface 1311 corresponds to one even-line light source unit 12b. The alignment direction of the odd-line light source unit 12a or the even-line light source unit 12b is parallel to the extending direction of the cylindrical lens 131. In operation, the parallel light rays emitted from the odd-line light source unit 12a illuminate on the first part 1311a of the incident surface 1311, and the parallel light rays emitted from the even-line light source unit 12*b* illuminate on the second part 1311*b* of the incident surface 1311. The transmitted light rays are refracted by the lens 131 so that a right-eye image is formed in the right eye, and a left-eye image is formed in the left eye. Accordingly, the three-dimensional depth information can be reconstructed from the right-eye image and the left-eye image in human brain according to a slightly different image in each eye. In alternative embodiment, each of the odd-line light source units 12*a* includes a plurality of light source units 12 arranged in three lines (A, B, C), and each of the even-line light source units 12*b* includes a plurality of light source units 12 arranged in three lines (D, E, F) (referring to FIG. 7). The transmitted light rays are refracted by the lens 131 so that a right-eye image of A, B, C is formed in the right eye, and a left-eye image of D, E, F is formed in the left eye. It can be understood that, the number of lines, the light source units 12 can be arranged in, not limited to one or three, it also can be three, six, etc.

Figure 8:
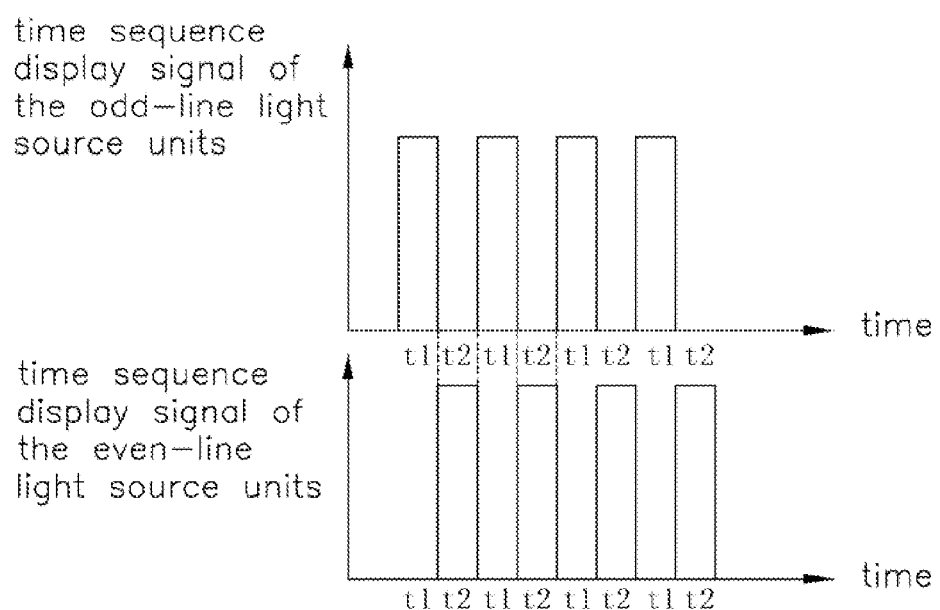
FIG. 8 is a signal sequence chart of the odd-line and even-line light source units, when there is no time slot between a time sequence display signal t1 of the odd-line light source units and a time sequence display signal t2 of the even-line light source units.
Figure 9:
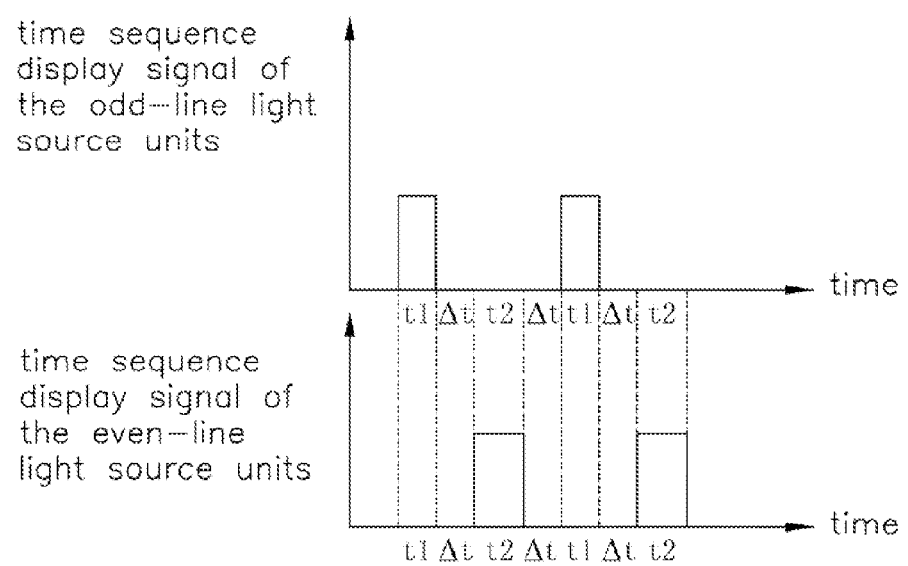
FIG. 9 is another signal sequence chart of the odd-line and even-line light source unit, when there has time slot between t1 and t2.

The stereoscopic display device 10 can further include a light source circuit 20 configured for alternatively sequencing the odd-line light source units 12*a* and the even-line light source units 12*b*. The timing chart of FIG. 8 shows the time sequence display signal t1 of the odd-line light source units 12*a*, and the time sequence display signal t2 of the even-line light source units 12*b*. The odd-line light source units 12*a* and even-line light source units 12*b* are alternatively turned on by the light source circuit 20. In other words, there is the first left-eye image, then the corresponding right-eye image, then the next left-eye image, followed by the corresponding right-eye image and so on. The time sequence display signal t1 or t2 has a frequency preferably greater than 120 or 240 Hz (hertz) to meet the requirement of visual persistence of human eyes. In the exemplary embodiment, there is no time slot (Δt) between t1 and t2. That is, a person cannot receive the left-eye image and the corresponding right-eye image in left and right eyes simultaneously. However, due to the persistence of vision phenomenon, the residual image is retained in eyes. That is, when the left eye receive the next left-eye image, the first right-eye image is retained in the right eye. Accordingly, the three-dimensional depth information can be reconstructed from the right-eye image and the residual image of the last time left-eye image in human brain according to a slightly different image in each eye. As a result, the 3D effect of the stereoscopic display device 10 is enhanced. In alternative embodiments, Δt may be greater than zero (referring to FIG. 7) but less than visual persistence time of human eyes.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Furthermore, this application is intended to cover such departures from the present disclosure as come within known or customary practice in the art to which the invention pertains and which fall within the limits of the appended claims or equivalents thereof.

What is claimed is:

1. A stereoscopic display device, comprising:
   a substrate;
   a plurality of odd-line light source units and a plurality of even-line light source units, the odd-line light source units and the even-line light source units being provided at a first side of the substrate and spaced from each other, the odd-line light source units cooperating to form a first image, the even-line light source units cooperating to form a second image, each of the odd-line light source units and the even-line light source units comprising a plurality of light source pixel units;
   a lens array arranged on the substrate at the first side thereof, the lens array being configured for displaying the first image and the second image, the lens array comprising a plurality of cylindrical stripe-like lenses, the cylindrical stripe-like lenses extending substantially parallel to each other; and
   a circuit configured for alternately outputting a first time sequence display signal to the odd-line light source units and a second time sequence display signal to the even-line light source units.

2. The stereoscopic display device as claimed in claim 1, wherein each of the cylindrical stripe-like lenses includes a lens body, and the lens body has an incident surface and a light emitting surface opposite to the incident surface.

3. The stereoscopic display device as claimed in claim 2, wherein the incident surface of the lens body is a plane surface, the light emitting surface of the lens body is a cylindrical surface.

4. The stereoscopic display device as claimed in claim 1, wherein each cylindrical stripe-like lens spatially corresponds to one odd-line light source unit and one neighboring even-line light source unit.

5. The stereoscopic display device as claimed in claim 4, wherein the light source pixel units of each of the even-line light source units and the odd-line light source units are arranged in a line parallel to the extending direction of the cylindrical stripe-like lenses.

6. The stereoscopic display device as claimed in claim 5, wherein each light source pixel unit comprises a plurality of light emitting diodes.

7. The stereoscopic display device as claimed in claim 6, wherein the light emitting diodes of each light source pixel unit comprises at least three light emitting diodes for emitting light of different colors.

8. The stereoscopic display device as claimed in claim 7, wherein the light emitting diodes of each light source pixel unit are arranged in a triangular pattern.

9. The stereoscopic display device as claimed in claim 7, wherein the light emitting diodes of each light source pixel unit are juxtaposed.

10. The stereoscopic display device as claimed in claim 7, wherein the light emitting diodes of each light source pixel unit are arranged in a pyramid pattern.

11. The stereoscopic display device as claimed in claim 1, wherein the first time sequence display signal or the second time sequence display signal has a frequency of greater than 120 Hz.

12. The stereoscopic display device as claimed in claim 1, wherein the first time sequence display signal or the second time sequence display signal has a frequency of greater than 240 Hz.

13. The stereoscopic display device as claimed in claim 1, wherein a time slot between the first time sequence display signal and the second time sequence display signal is zero.

14. The stereoscopic display device as claimed in claim 1, wherein a time slot between the first time sequence display signal and the second time sequence display signal is greater than zero and less than visual persistence time of human eyes.

* * * * *